United States Patent Office 3,236,305
Patented Feb. 22, 1966

3,236,305
METHOD OF ACIDIZING WELLS
Christ F. Parks, Tulsa, Okla., assignor to The Dow Chemical Company, Midland, Mich., a corporation of Delaware
No Drawing. Filed May 27, 1963, Ser. No. 283,594
4 Claims. (Cl. 166—42)

This application is a continuation-in-part of application Serial No. 82,677, now abandoned filed January 16, 1961.

The invention relates to an improved method employing an aqueous composition as a workover fluid for reworking or treating a well which has been or is a producing well.

The term, aqueous composition, as used herein, includes solutions, dispersions, slurries, gels, and emulsions in which water is employed as the liquid medium. Aqueous compositions may refer to fresh water, brines, oil-water emulsions, gum-thickened water, soapthickened gels, and the like with or without organic or inorganic materials dissolved, suspended, or slurried therein.

The term, workover fluid, refers herein to fluids used primarily in reworking, e.g., altering, repairing, or cleaning a well, to perforating casing, to holding packers in place, to fracturing, acidizing, and plugging off sand and water. For a discussion of workover fluids and their use, reference is recommended to a Reader Service Reprint of The Petroleum Engineer, Drilling and Producing, (1956), entitled "Well Workover Handbook," available from The Petroleum Engineer Publishing Company, P.O. 1589, Dallas 21, Texas. For example, pages 6 to 11, thereof, sets out and discusses workover operations. The term, workover fluid, and reworking a well, are used herein in the sense employed in the discussion set forth in the cited publication.

One embodiment of the invention relates especially to such method wherein the use of a workover fluid of increased density is required, as a packer fluid, i.e., a fluid to hold a packer in position which advantageously is a high density aqueous liquid which is positioned directly above and rests on a packer. Such fluids to be fully satisfactory should be stable to resist degeneration by heat for relatively long periods of time, and should possess low fluid loss properties since they sometimes are retained in a well, e.g., in the annulus between casing and tubing, for prolonged periods of time. Fluids used in such workover treatments as repairing or perforating casing are often used without packers, being preceded and/or followed by drilling mud (as a convenient and economical weighing material) which must be kept from contaminating the level of treatment. It is highly desirable that such workover fluid be relatively viscous to maintain good separation at the contacting faces of the mud.

Another embodiment of the invention relates especially to an improved method of acidizing or combined fracturing and acidizing fluid-containing subterranean formations penetrated by a well. An aqueous acidizing composition always contains a substance reactive with the formation for the purpose of enlarging passages therethrough and thereby increasing the rate and amount of production of formation fluids therefrom. An acidizing composition, accordingly, must first of all be reactive with the formation to convert at least portions thereof into products which are soluble to some extent. The formation commonly acidized is composed, at least in part, of $CaCO_3$. The additament which is reactive with the formation is usually an acid, hydrochloric acid commonly being employed, and containing a small amount of a corrosion inhibitor to protect metal parts against acid corrosion. It is also highly desirable that the rate of reaction of a composition used in acidizing formations traversed by a well be controllable as, for example, that the rate of reaction be suitably retarded so that the acidizing composition does not spend itself only upon portions of the formation immediately adjacent to the borehole, perhaps to the extent of creating undesirable cavities there, and failing to penetrate the formation to an appreciable distance from the borehole. Such uncontrolled attack on the formation does not permit extension of the acidizing treatment sufficiently far from the wellbore to be considered satisfactory.

Aqueous media used in such well treating operations as fracturing, acidizing, and the like, must be resistant to excessive loss thereof to the formation. Such loss leads to poor results and high cost.

Uncontrolled attack of an acidizing solution on the rock in the formation with which it first comes in contact results in little or no attack on rock further removed from the wellbore; this is highly undesirable.

A need exists for a more effective method of reworking wells including fracturing and acidizing, particularly when acidizing is combined with fracturing in a single operation. There is a special need for a method employing an additament which is readily available, is economical to use, and can be conveniently admixed with an aqueous workover or well treating composition to impart greater viscosity, less turbulence during pumping, less resistance to flow, lower fluid loss to the formation, and a retarded controlled attack on calcium carbonate-containing formations to workover and treating compositions.

The principal object of the invention is to provide such improved method wherein wells may be reworked and treated more efficiently and more effectively.

The preparation and the properties of the composition of the invention and the method of use thereof in oil well workover and treating operations will be made clear in the ensuing description and are specifically defined in the appendant claims.

The invention, accordingly, is a method of reworking and treating a well which encompasses and contemplates repairing and cleaning wells, positioning packers, perforating casing, cementing well casing, sealing off connate water, hydraulic fracturing, acidizing, demulsifying oil and water emulsions, flushing debris from the well, and the like.

The composition employed in the method of the invention comprises water or brine having admixed therewith between 1 pound and 200 pounds, per thousand gallons of the composition, of an anionic polysaccharide known as Polysaccharide B–1409, hereinafter usually referred to merely as B–1459.

B–1459 is procurable from the United States Department of Agriculture, Agricultural Research Service, Northern Utilization Research and Development Division, Peoria, Illinois or by contacting the United States Department of Agriculture, Washington 25, D.C.

B–1459 is considered to have the molar ratio of mannose, glucose, glucuronate, and acetyl groups of 3:3:2:2, respectively, as determined by recent tests by the United States Department of Agriculture, although earlier work estimated the molar ratio of the mannose, glucose, glucuronate, and acetyl groups to be 2:2:1:1, respectively as described in the publication identified as CA–N–9 of September, 1959, entitled "Information on Polysaccharide B–1459," published by the United States Department of Agriculture, Agricultural Research Service, Northern Utilization Research and Development Division, Peoria, Illinois.

B–1459 is normally a soft, bulky, slightly colored powder, having a molucular weight of about $1 \times 10^6$ and being anionic in nature. It has high resistance to bacterial action and remarkable stability, particularly in the presence of a polyvalent metal salt such as calcium chloride. It may be dissolved in water at room temperature or a higher temperature to produce a non-thixotropic fluid which shows a tendency to gelation. It has a pH value in the range of from about 7 to about 8.5 when in an aqueous concentration of from 0.1 to 1.0% by weight. It shows substantially no rotation of polarized light.

B–1459 may be prepared in water solution containing between 2.5 and 3 percent dextrose, 0.4 percent of a nitrogen source known as "distiller solubles," procurable from the major distilling industries by such identification, about 0.5 percent dipotassium phosphate, and about 0.01 percent Epsom salts, to which is admixed an inoculating bacterium known as Xanthomonas Campestris; a fermentation period thereafter provided. The composition so prepared preferably has a potassium content of not more than 5.4 percent by weight and a chloride content sufficiently low to represent less than 0.3 percent KCl. The nitrogen content is preferably less than about 0.4 percent by weight and a phosphorus content of not more than 0.2 percent by weight. It usually has a specific rotation of about zero.

In the preparation of B–1459 the pH of the solution is is adjusted to 7. The solution is sterilized by heating to about 275° F. for about three minutes. The solution is then cooled by passing it through a heat exchanger until a temperature of between about 80° and 84° F. is obtained. The solution is then inoculated by adding a culture of the bacterium Xanthomonas Campestris in an amount of about 5 percent, by volume of the solution, to make a broth. The pH is maintained thereafter, by the addition of the dipotassium phosphate, at a value of between 6.2 and 6.7. Following inoculation with the bacterium, the broth is allowed to ferment for a total of about 96 hours. During this period the broth is agitated and aerated. Aeration is usually provided by admitting a stream of air at the bottom of the fermentation bath. After about 24 hours of the 96-hour period, a noticeable increase in viscosity is observed which continues to increase until a final viscosity of about 7000 centipoises (measured by the Brookfield viscosimeter) is reached at the end of 96 hours. The broth is then drumdried. It contains about 50 percent of the active polysaccharide above described. The remaining 50 percent consists mainly of soluble sugars and salts plus some insoluble cell walls which have no deleterious effect on the composition for use in the practice of the invention.

Additional information on the nature and properties of Polysaccharide B–1459 may be obtained by referring to the aforementioned publication CA–N–9 of the United States Department of Agriculture or the Journal of Applied Polyscience, volume V, issue 7, pages 519–526 (1961) entitled "Polysaccharide B–1459: A New Hydrocolloid Polyelectrolyte produced from Glucose by Bacteria Fermentation" by Jeanes, Pittsley, and Senti of the United States Department of Agriculture.

Additional information may also be obtained from licensed manufacturers of Polysaccharide B–1459, e.g., Archer-Daniels-Midland Company, 733 Marquette Avenue, Minneapolis, Minnesota, which has such information available under ADM Technical Data Publication, e.g., that identified as No. B–8, entitled "ADM Experimental Product 7097," dated July 18, 1962.

Because of its stability in the presence of salts, it is particularly effective and highly desirable as a fluid loss agent and retardant to $CaCO_3$ attack by acids in well workover and well treating operations employing a brine, or where brine may be encountered during the treatment.

In the presence of appreciable amounts of dissolved salts in the water, e.g., brines having a specific gravity of about 1.05 or more, i.e., the so-called heavy brines, a less amount of the polysaccharide need be employed than in light brines, i.e., those having a specific gravity of between 1 and 1.05 or in substantially fresh water to attain comparable beneficial effects on viscosity and fluid loss. Usually there are employed, in fresh water, between about 48 and 100 pounds or more of the above-described polysaccharide per 1000 gallons of the composition whereas in light brines, there are employed, between about 12 and 100 pounds thereof and in heavy brines, there are employed, between about 2 and 100 pounds of the polysaccharide per 1000 gallons of the resulting composition.

A series of tests (designated Series One) was run to show the effect of adding the B–1459, as above described, to aqueous well workover compositions. The effectiveness of the additive was tried in brines, designated A to E, having the following characteristics:

Brine A, comprising 22 percent by weight $CaCl_2$ and 78 percent water and having a density of ten pounds per gallon.

Brine B, comprising 33 percent by weight $CaCl_2$ and 67 percent water and having a density of 11 pounds per gallon.

Brine C, comprising 20 percent by weight $CaCl_2$, 33 percent $ZnCl_2$, and 47 percent water and having a density of 14 pounds per gallon.

Brine D, (to simulate a typical natural brine) comprising 11.5 percent by weight NaCl, 2.1 $CaCl_2$, 1.5 percent $MgCl_2 \cdot 6H_2O$, and 84.9 percent water and having a density of 10 pounds per gallon.

Brine E, comprising 7.5 percent NaCl and 92.5 percent water and having a density of 8.79 pounds per gallon.

The fluid loss of both fresh water and the above-described brines, with or without the weight of the polysaccharide set out in the following table per thousand gallons of the treating fluid, was measured. The fluid loss was determined by employing the apparatus described in API RP 29 employing either (1) a filtration area of 7.07 square inches, a pressure cell having a fluid capacity of 300 milliliters, and carrying out the test at 80° F. and 100 p.s.i.g. pressure, or (2) a filtration area of 3.72 square inches and a pressure cell having a fluid capacity of 160 milliliters and at a temperature of 180° F. and 1000 p.s.i.g. pressure, according to the designation set forth by the table.

TABLE I

[Effect of polysaccharide B-1459 on fluid loss of fresh water and designated brines]

| Test | Aqueous solution | Polysaccharide B-1459 in pounds per 1,000 gallons | Type of fluid loss apparatus | Fluid loss in milliliters (ml.) after stated time (Time in minutes) | | | | |
|---|---|---|---|---|---|---|---|---|
| | | | | 1 | 4 | 9 | 16 | 25 |
| 1 | Fresh water | | (1) | 300 | | | | |
| 2 | do | | (2) | 160 | | | | |
| 3 | do | 48 | (1) | 129 | 142 | 146 | 150 | 154 |
| 4 | Brine A | | (1) | 300 in 2 min. and 10 sec. | | | | |
| 5 | do | | (1) | 278 in 25 min. | | | | |
| 6 | do | 1 | (1) | | | | | |
| 7 | do | 2 | (1) | 18 | 28 | 41 | 54 | 77 |
| 8 | do | 4 | (1) | 17 | 24 | 32 | 42 | 53 |
| 9 | do | 6 | (1) | 6.2 | 10.2 | 15.8 | 22.2 | 30.2 |
| 10 | do | 12 | (1) | 4.3 | 6.8 | 9.8 | 13.2 | 16.8 |
| 11 | do | 48 | (1) | 0.8 | 2.6 | 4.8 | 7.0 | 9.3 |
| 12 | Brine B | 48 | (3) | 21.8 | 23.4 | 25.2 | 26.8 | 28.0 |
| 13 | Brine C | 48 | (1) | 0 | 3.4 | 7.2 | 10.8 | 13.6 |
| 14 | Brine D | | (1) | 300 in 1 min. and 49 sec. | | | | |
| 15 | do | 6 | (1) | 6 | 9.5 | 13.5 | 18 | 23 |
| 16 | do | 12 | (1) | 21 | 24 | 27.4 | 31 | 34.8 |
| 17 | do | 12 | (2) | 10 | 13.8 | 20.4 | 25.6 | 31.6 |
| 18 | do | 12 | (1) | 5.5 | 8.2 | 11.4 | 14.8 | 18.4 |
| 19 | do | 12 | (2) | 15.4 | 20.8 | 25.6 | 30.4 | 35.6 |
| 20 | Brine D | 48 | (1) | 5.1 | 7.8 | 11 | 14.2 | 17.6 |

(1) Fluid loss apparatus, described in API RP 29 for low temperature, low pressure work: filtration area=7.07 in.²; fluid capacity of test cell=300 ml.; tests made at 80° F. and 100 p.s.i.
(2) Fluid loss apparatus for high temperature, high pressure work: filtration area=3.72 in.²; fluid capacity of test cell=described in API RP 29, 160 ml.; test made at 180° F. and 1,000 p.s.i.g.
(3) Fluid loss apparatus similar to (2) except test made at 200° F. and 1,500 p.s.i.g.

Portions of the brine and B-1459 compositions of Series One as tested and the results reported in Table I above, were allowed to stand for 14 days at the advanced temperatures of either 250° F. or 275° F. The thus aged compositions were tested for fluid loss properties and found to show but a slight increase in fluid loss when tested after the 14-day period, as compared to the tests obtained on the substantially freshly prepared compositions.

Reference to Table I shows that the fluid loss, as measured by the standard API filtration tests employed, was very definitely lessened for the fresh water and each of the brines employed.

A second series of tests was run to show the effect of the presence of B-1459, when employed in the practice of the invention, on viscosity of aqueous fluids employed in reworking wells. The tests were conducted similarly to those set out in Table I, viz., by merely admixing B-1459 in the amount set out in Table II with fresh water or the brine there indicated.

TABLE II

[Viscosity of various aqueous solutions containing Polysaccharide B-1459]

| Test | Aqueous solution | B-1459 in pounds per 1,000 gallons | Temp. in ° F. | Viscosity in c.p.s. after various times in hours | | | |
|---|---|---|---|---|---|---|---|
| | | | | 1 | 16 | 24 | 40 |
| 21 | Fresh water | | 80 | 1 | | | |
| 22 | do | 48 | 80 | 1,340 | | | |
| 23 | Brine A | | 80 | 7 | | | |
| 24 | do | 24 | 80 | 1,600 | 6,500 | 1,400 | 5,800 |
| 25 | do | 48 | 80 | 2,900 | 40,000 | 40,000 | 7,600 |
| 26 | Brine A | | 200 | 4 | | | |
| 27 | do | 24 | 200 | 70 | 58 | 118 | 74 |
| 28 | do | 48 | 200 | 10,500 | 6,200 | 1,110 | 330 |
| 29 | Brine B | | 200 | 8 | | | |
| 30 | do | 48 | 200 | 100 | 128 cps. after 18 days | | |
| 31 | Brine C | | 80 | 25 | | | |
| 32 | do | 24 | 80 | 290 | 290 | 380 | 300 |
| 33 | do | 48 | 80 | 5,000 | 7,600 | 7,600 | 3,300 |
| 34 | do | 24 | 200 | 58 | 28 | 92 | 80 |
| 35 | do | 48 | 200 | 226 | 50 | 110 | 92 |
| 36 | Brine D | 48 | 80 | 200 | | | |

Viscosity measurements made using Brookfield Synchro-lectric Viscosimeter, Model LVF.

Reference to Table II shows that the viscosity was increased in the fresh water and very markedly increased in the brines employed. Such improvement in viscosity is of great importance both in rendering the liquid more effective in suspending materials contained therein and in a reduction in turbulence when pumped, which is of value in moving such fluids through pipes and tubing.

A third series of tests was run to show the effect of variations in the amount of B-1459 added to a brine of the type employed in workover fluids. The brine employed was Brine A, described above. The amounts of B-1459 are set out in Table III below. The procedure consisted in adding B-1459 accompanied by agitation. The viscosity values obtained are also set out in Table III.

TABLE III

[Viscosity at 80° F. after 1 hour]

| Test No. | Pounds of B-1459 per 1,000 gallons of Brine A | Viscosity in centipoises |
|---|---|---|
| 37 | 12 | 720 |
| 38 | 6 | 140 |
| 39 | 2 | 39 |
| 40 | 1 | 20 |

Viscosity measurements were made using a Brookfield Synchro-lectric Model LVF Viscosimeter.

Reference to Table III shows that substantial improvements in viscosity result when the B-1459 is added to a CaCl₂ brine in accordance with the invention. It is recommended that at least 2 pounds of B-1459 per 1000 gallons of brine be employed although some benefit resulted from the use of 1 pound of the polysaccharide.

A fourth series of tests was run to show the effect, if any, of the presence of Polysaccharide B-1459, on the permanent permeability of a formation to flow from the formation into the borehole after the formation had been contacted by a brine containing the polysaccharide there as in drilling and work-over operations.

Brine B was subjected to the Matrix Permeability Damage test, identified as Schedule VI of API RP 39, 1st Edition (July, 1960), obtainable from the American Petroleum Institute, Division of production, Dallas, Texas.

The results are shown in Table IV below:

TABLE IV

| Test No. | Concentration of B-1459 in lb./1,000 gal. of brine | Percent damage to formation as calculated in par. 623 of section VI, API RP 39 |
|---|---|---|
| 41 | None | 49.0 |
| 42 [1] | 24 | 51.0 |
| 43 [1] | 48 | 53.0 |

[1] In tests 42 and 43, the 2-inch diameter, 1-inch long Berea sandstone cores (required by the test) were first saturated with 3% by weight aqueous $CaCl_2$ solution.

Reference to Table IV shows that the composition employed in the method of the invention does not result in any significant plugging of a formation when back flowed after treatment with the brine and B-1459 composition.

A fifth series of tests was run to show that the separate ingredients employed in the preparation of Polysaccharide B-1459, mere physical mixtures thereof, or other selected polysaccharides are not satisfactory or acceptable in the practice of the invention. The tests were made employing Brine A, as above described, at 80° F. The separate ingredients, the physical admixture of the individual components which when chemically united go to make up the Polysaccharide B-1459, or other polysaccharides, viz., xylan and chitin, were admixed with the brine and the viscosity tested, as in the runs set out in the preceding tables. The results obtained in these runs are set out in Table V.

TABLE V

[Effect of various polysaccharide components on viscosity of brine temperature employed was 80° F.]

| Test No. | Concentration additive per lbs./ 1,000 gallons of Brine A | Viscosity [1] (cps.) |
|---|---|---|
| 44 | None | 7 |
| 45 | 48 D-mannose | 6 |
| 46 | 48 Glucose | 7 |
| 47 | 48 Potassium glucuronate | 7 |
| 48 | 48 Acetyl acetone [2] | 6 |
| 49 | 48 3:3:2:2 mixture of D-mannose: glucose:potassium glucuronate and acetyl acetone, respectively. | 7 |
| 50 | 48 Xylan | 16 |
| 51 | 48 Chitin | 10 |
| 37 (Table III) [3] | 12 Polysaccharide B-1459 | 720 |

[1] Viscosity measurements made using Brookfield Synchro-lectric Viscosimeter Model LVF.
[2] The acetyl acetone was added in an attempt to provide active acetyl groups as the active ingredient.
[3] Test 37 is repeated here from Table III for convenient reference.

Reference to Table V shows that the results obtained in all runs were unsatisfactory and that separate ingredients, mere physical mixture of separate ingredients which go to make up the complex B-1459, or other selected polysaccharides, are not satisfactory for use in the practice of the invention.

To illustrate a practice of the invention employing a brine in a workover operation, e.g., reperforating casing, the following example is set out.

*Example*

7800 pounds of a water are placed in a suitable tank, pit, or the like, provided with appropriate stirring equipment. 2200 pounds of $CaCl_2$ are admixed with the water to produce 1000 gallons of a brine having a density of about 10 pounds per gallon. (Such density is satisfactory for a workover fluid for reperforating and the like but $CaCl_2$ brine, unmodified, is not sufficiently viscous to such use since its viscosity is only about 7 cps. Furthermore, the fluid loss, as determined by the above-described API filtration test, is 300 milliters in 2 minutes and 10 seconds, (see Run 4, Table I) which is far too great for use of the brine, unmodified, as a workover fluid.)

In accordance with the practice of the invention, 24 pounds of B-1459, as above described, is admixed with each 1000 gallons of the brine accompanied by vigorous stirring. The resulting composition has a viscosity of 1600 cps. at 80° F. and a fluid loss, by the high pressure-high temperature API filtration method (1000 p.s.i. at 180° F.), of 15 milliliters in 25 minutes. The composition so made is then injected down the cased wellbore and positioned (spotted) in the casing at the level where it is desired to perforate the casing. Ordinary drilling mud or other liquid to provide hydraulic pressure may be injected down on top of the perforating fluid. A perforating gum is then lowered down the wellbore through the fluids in the casing and the casing then perforated as desired.

The high density clear workover fluid containing B-1459 provides the desired pressure in the casing, is resistant to deterioration by heat, is sufficiently viscous to maintain a definite phase from the super-positioned mud, and is non-contaminating of the formation.

After perforation is accomplished, the gum is withdrawn from the well and the mud, followed by an appreciable portion of the clear workover fluid are flushed from the well.

Although this embodiment of the method of the invention may be practiced in substantially the same manner when employing either brines or fresh water, it is recommended (as aforesaid) that the amount of additive employed in water be somewhat greater. For example, whereas as little as 1 pound of the B-1459 may be sufficient per 1000 gallons of the composition employing heavy brines, i.e., brines of greater specific gravity than 1.05, between 12 and 100 pounds of B-1459 are recommended per 1000 gallons of composition employing light brines, i.e., those having a specific gravity of more than 1.01 and less than 1.05, and at least about 48 pounds, per 1000 gallons of composition, are recommended for compositions employing substantially fresh water as the aqueous medium.

The method of the invention is especially adapted to acidizing $CaCO_3$-containing formations penetrated by a well. According to this embodiment of the invention, B-1459 is incorporated or admixed with an aqueous acid or an oil-water or brine emulsion containing some acid, within the 1 to 100 pounds thereof per 1000 gallons of acidizing composition, similarly as when drilling or re-working a well. The acidizing composition is injected down a wellbore and back into the formation, usually by pumping under pressure. The acid composition thus injected attacks the formation and converts portions thereof to soluble materials, e.g., $CaCO_3$, $CO_2$, and water. The presence of the B-1459 desirably retards the acid attack on the $CaCO_3$ rock as well as lessens the loss of fluid undesirable to the unconsolidated portions of the formation.

In more detail, this embodiment of the invention is carried out by admixing a prepared aqueous acidic solution, e.g., one of HCl, formic, or acetic, from 1% by weight to the point of saturation, and B-1459, either dry or in an aqueous solution, in a suitable mixer, and injecting the resulting substantially uniformly mixed aqueous composition down a wellbore previously provided with suitably positioned packers so that the treating composition can be located or spotted at the desired elevation or stratum to be acidized. It may be found convenient to add the B-1459 to the acid solution as it enters the well, taking advantage of the turbulence to enhance mixing. Sufficient pressure is applied during injection to force the acidizing composition containing the retardant, fluid loss inhibitor B-1459, back into the formation and into any existing fractures present. According to one embodiment of the invention, sufficient pressure is applied during injection of the aqueous composition to create fractures in the formation and thus attain the benefits of both fracturing and acidizing in one operation.

A number of additional series of test runs was made which showed the efficacy of the invention in contrast to acidizing according to conventional practice. The tests were carried out by exposing weighed samples of a calcium carbonate rock, of specific size, to a measured amount of an aqueous acid solution of known strength, confined in a stainless steel reaction chamber under a high nitrogen gas pressure to simulate the pressures in subterranean formations. The time of reaction between the acid and the calcium carbonate rock was carefully timed. Agitation was provided during the reaction period to approximate the turbulence existing during the injection operation. At the end of the test runs, the pressure was released and the sample of calcium carbonate rock remaining was removed and washed wtih water, dried, and reweighed. The loss of weight of the sample during the test was then ascertained and such weight loss divided by the exposed surface area of the calcium carbonate rock sample to give the pounds of rock removed, by attack of acid per square foot of area per second of reaction.

SERIES SIX

The test conditions which were common to all of the tests of this series are as follows:

Type of CaCO₃ rock _____ Alabama cream marble.
Temperature in ° F. _____ 80.
Test time in minutes _____ 2.
Pressure under N₂ _____ 1000 p.s.i.g. (gauge).
Size of rock samples _____ 1″ x 1″ x 0.3″ (2.3 in.²).
Acid employed _____ 15% by weight aqueous HCl.
Ratio of surface of samples in in.² to volume ratio of acid in in.³ _____ 1:1.

The tests were carried out by placing each weighed sample of marble in a compartment and the aqueous acid solution in another compartment of the same steel vessel so constructed that the acid remained separate from the marble so long as the vessel remained upright. A gas inlet, positioned in the reaction vessel, was connected to a nitrogen gas source. The time was observed and the reaction vessel containing the aqueous acidic composition and marble in separate compartments was inverted to bring the acidic solution and marble into contact. The reaction vessel was placed in a constant temperature bath of 130° C. and also placed on a mechanical shaker which provided 130 oscillations per minute through a 1.5- to 2-inch oscillation.

After the expiration of the desired time, the steel reaction vessel (and the compartments therein) were reinverted to their original positions which caused the acid to drain away from the marble and the reaction between the acid and marble substantially to stop. The pressure was released on the vessel, the sample removed, washed, dried, and reweighed, and the weight loss ascertained.

The amount of B-1459 employed in Series Six, made up of Examples 1 to 8 of the invention and Comparative Tests A, B, and C, and the reaction rate between the aqueous acidic composition and the marble in pounds per square foot per second in each example and comparative tests are shown in Table VI. Comparative Tests A, B, and C were made to show the marked difference in the results obtained when either no B-1459 was employed or other gums which are not equivalent to the B-1459.

TABLE VI

| Test | Percent by wt. of additive | Reaction rate in lb./ft.²/sec. |
|---|---|---|
| 53 | 0.03 B-1459 | 0.00145 |
| 54 | 0.06 B-1459 | 0.00140 |
| 55 | 0.12 B-1459 | 0.00120 |
| 56 | 0.35 B-1459 | 0.000725 |
| 57 | 0.72 B-1459 | 0.000449 |
| 58 | 1.08 B-1459 | 0.000304 |
| 59 | 1.44 B-1459 | 0.000272 |
| 60 | 1.80 B-1459 | 0.000224 |
| A | None | 0.00158 |
| B | 0.36 Karaya gum | 0.000995 |
| C | 0.72 Guar gum | 0.000780 |

By reference to Table VI, it can be seen that B-1459 reduced the rate of reaction between the acid and the calcium carbonate rock when used in as small an amount as 0.03%, based on the weight of the aqueous acidizing composition, and that such retarding effect continues to decrease as the amount of the B-1459 is increased to as much as 1.80% by weight of the acidizing composition. It is also shown in the table that the use of either karaya gum or guar gum by no means attains the retardation effect attained by the use of the B-1459. Continued lessening of the rate of reaction beyond 1.8%, by increasing the percent of the B-1459 employed, is apparent by extrapolation of the results shown in the table. However, it must be borne in mind that the retardation of the acidizing action must not be so great that insufficient acid attack on the rock results. The amount of the B-1459 used may be between about 0.03 and 1.8%, but is preferably between about 0.12 and 1.08%, by weight of the aqueous acidizing composition.

SERIES SEVEN

Since the acidizing composition, employed during acidizing a formation, is progressing or advancing into the formation or, in other words, is in a state of motion (particularly in the earlier part of the operation) the reaction rates of acid solutions with or without the benefit of the presence of B-1459 were evaluated for varying flow conditions in a series of tests. In carrying out this series of tests, acid solutions of known concentration were caused to flow through prepared samples of calcium carbonate rock. The samples were prepared by cutting pieces of CaCO₃ rock (marble being employed about 9.5 inches measured along the bedding planes) along a plane to provide two parts with mating faces and then repositioning the parts substantially as they were originally in the piece of rock, but spaced apart 0.1 inch to provide a simulated fracture. Each so made sample had a simulated 0.1 inch fracture which was 1.5 inches wide and extended 9.5 inches along a bedding plane of the piece of rock. The rock samples were weighed before and after each test and the weight loss in lb./ft.²/sec. was calculated from the weight of sample dissolved, the area of rock exposed along the simulated fracture, and the time of reaction. In each of Examples 61 to 66 of the invention, and in Comparative Runs D to H, set out in Table VII below, the rate of flow was calculated from the volume flow rate and the cross-sectional area of the simulated fracture. The reaction rate was calculated by determining the calcium content of the effluent acid, the sample area, and the reaction time.

TABLE VII

| Test | Percent by wt. B-1459 | Flow velocity, ft./sec. | Reaction rate in lb./ft.²/sec. |
|---|---|---|---|
| 61 | 0.12 | 0.05 | 0.00019 |
| 62 | 0.12 | 2.00 | 0.00071 |
| 63 | 0.12 | 10.00 | 0.00251 |
| 64 | 0.36 | 0.05 | 0.00019 |
| 65 | 0.36 | 2.00 | 0.00067 |
| 66 | 0.36 | 10.00 | 0.00153 |
| D | None | 0.05 | 0.00037 |
| E | ----do---- | 2.00 | 0.00152 |
| F | ----do---- | 10.00 | 0.00700 |
| G | 0.36 Karaya gum | 2.00 | 0.00105 |
| H | 0.72 Guar gum | 2.00 | 0.00108 |

By reference to Table VII, it can be seen that the increased velocity or rate of flow in all instances increased the reaction rate. It is clearly shown, however, in the table, that the reaction rate when accelerated by the increased rate of flow, when employing either 0.12 or 0.36% B-1459 (based on the weight of the aqueous acidizing composition), was markedly retarded in contrast to the rate of reaction at the higher rates of flow when no B-1459 was present. By comparing the reaction rate of the acidic composition containing the B-1459 with the acidic composition containing karaya gum or guar gum, in comparable amounts of additive, at a flow rate of 2 feet per second, it is quite apparent that the retarding effect brought about by the karaya and guar gum was definitely less than that shown by comparable amounts of B-1459.

SERIES EIGHT

Another series of tests was run to show the effect that treatment of a calcium carbonate-containing rock with an acidizing composition containing B-1459 has upon a subsequent treatment in reducing the reactivity during such subsequent treatment. These tests are designated Examples 67 and 68. Example 67 was conducted by treating a weighed marble specimen, of the size described in Series One above, with a 15% by weight aqueous HCl solution containing 0.36% by weight of B-1459 for 1 minute. This is designated 67a on Table VIII. The specimen was then treated with 15% by weight aqueous HCl and again washed, rinsed, and reweighed. The results are designated 67b in Table VIII. Example 68 was conducted by treating a weighed specimen as in Example 67, for 1 minute in 15% by weight aqueous HCl solution, designated 68a but, thereafter, without washing or drying, immediately treating the specimen with 15% aqueous HCl solution. The results are shown in Table VIII as 68b.

The purpose of the eighth series of tests was to show the persistency of the retardation effect produced by the B-1459 on subsequent acid treatments in which there was no retardant present. The conditions common to each of the tests in this series were the same as those employed in the first series hereinabove.

TABLE VIII

| Test | Percent by wt. B-1459 | Test time in min. | Explanation | Weight loss in grams |
|---|---|---|---|---|
| 67a | 0.36 | 1 | Sample so treated washed, dried, and weighed. | 0.5596 |
| 67b | None | 1 | Dried sample of 67a treated with aqueous HCl only (no B-1459) and again washed, dried, and reweighed. | 1.1029 |
| Total | | 2 | | 1.6625 |
| 68a | 0.36 | 1 | Same as sample 67a, but was NOT washed, dried, nor weighed but removed and treated with aqueous HCl only. | |
| 68b | None | 1 | Sample 68a, washed, dried, and reweighed. | |
| Total | | 2 | | 1.4544 |

Reference to Example 67 of Table VIII shows that when CaCO₃-containing rock is treated with aqueous HCl acid containing B-1459 and the treated surface is not washed to remove any B-1459, the rate of reaction when subsequently exposed to aqueous HCl acid containing no B-1459 is slower than the rate of reaction on a sample which was untreated or which had the adhering acid containing B-1459 washed off before the treatment with HCl containing no B-1459. In other words, the presence of B-1459 in an acid solution slows down subsequent acid attack, apparently providing a protective film thereon.

SERIES NINE

To show the effect of B-1459 in aqueous acidic solutions other than HCl to retard the attack thereof on CaCO₃ rock, a fourth series of tests was run. The CaCO₃ rock and all conditions were the same as in Series Six except that 24% acetic acid and 19% formic acid were employed instead of aqueous HCl. The amount of B-1459 employed and the rate of reaction, of both the acidic solutions containing B-1459 and without additament for comparative purposes are set out in Table IX.

TABLE IX

| Test | Acid | B-1459 in percent by wt. | Reaction rate in lb./ft.²/sec. |
|---|---|---|---|
| J | 24% acetic | None | .0000888 |
| 69 | ----do---- | 0.36 | .0000385 |
| L | 19% formic | None | .0002940 |
| 70 | ----do---- | 0.36 | .0001600 |

Reference to Table IX shows that the rate of reaction of either formic or acetic acid on CaCO₃ rock is definitely retarded by the presence of B-1459. The presence of B-1459, in addition to its desirable retarding effects on the rate of reaction of an aqueous acid solution on CaCO₃ rock, also exhibits a marked beneficial reduction in fluid loss to a formation during acidizing and fracturing. A series of tests, identified as Series Ten and was run as follows:

SERIES TEN

Bedford limestone, having a permeability of 0.3 millidarcie to air, was cut into cores, 1 inch in diameter and 3 inches long. The fluid loss was ascertained according to Section V of API RP 39 1st Edition (July 1960). The temperature employed was 80° F. and the pressure 1000 p.s.i.g. The fluid employed was a 15% by weight aqueous solution of HCl containing 0.4% by weight of an amine type inhibitor against metal corrosion, and in the tests so indicated, up to 300 pounds of CaCl₂ per 1000 gallons.

Compositions prepared were also ascertained on a Fann viscosimeter at 80° F. and at 100 r.p.m. The results are shown in Table X.

TABLE X

| Test No. | B-1459 in lb./1,000 gallons | CaCl₂ in lb./1,000 gallons | Volume in ml. through core at end of indicated minutes | | | | | Viscosity in centipoises measured on Fann Viscosimeter, 80° F., 100 r.p.m. |
|---|---|---|---|---|---|---|---|---|
| | | | 1 | 4 | 9 | 16 | 25 | |
| 19 | 30 | 0 | 0.2 (All fluid in cell through in 1.3 min.) | | | | | 18.0 |
| 20 | 30 | 100 | 0 | 0.9 | 1.4 | 2.0 | 2.5 | 19.5 |
| 21 | 30 | 300 | 0 | 0.1 | 0.8 | 1.4 | 1.9 | 19.5 |
| 22 | 60 | 0 | 0 | 0.5 | 0.9 | 1.5 | 1.9 | 34.5 |
| 23 | 60 | 100 | 0 | 0.4 | 1.0 | 1.6 | 2.1 | 42.0 |
| 24 | 60 | 300 | 0 | 0.1 | 0.8 | 1.4 | 1.9 | 42.0 |

Reference to Table X shows that the presence of the B–1459 greatly lessens the fluid loss according to the standard test of Section V of API RP 39. It shows that it is particularly effective in brines.

When guar gum or karaya gum was employed in 15% aqueous HCl, in the amount of 40 pounds of the gum per 1000 gallons of the aqueous HCl, and the viscosity on the Fann viscosimeter ascertained at 80° F. and 100 r.p.m., the highest viscosity value obtained after 1 hour standing was 3.4 centipoises and the highest viscosity obtained after 6 hours standing was 8.4 centipoises. Longer standing thereafter showed a gradual decline in viscosity down to 2.7 centipoises after 24 hours standing.

The practice of the invention offers a number of advantages in reworking a well in its broad sense. Examples set out in Tables VI to X show that when either fracturing or acidizing a formation, particularly when employing a brine; there is a retardation of acid attack on formation rock containing $CaCO_3$; there is increased viscosity and suspending properties for sand employed as a propping agent in fracturing; there is a marked reduction in fluid loss to the formation in both acidizing and fracturing; the composition employed in the invention is highly resistant to deterioration due to heat, even at temperatures approaching 300° F., which are in excess of this customarily encountered in fluid-producing formation.

Having described my invention, what I claim and desire to protect by Letters Patent is:

1. A method of acidizing a calcareous subterranean formation traversed by a well consisting of admixing, with an aqueous acidic fluid selected from the class consisting of solutions of (1) water and acid and (2) brine and acid, a polysaccharide comprising combined groups of: mannose, glucose, potassium glucuronate, and acetyl groups in the molar ratio of about 3:3:2:2, which has a potassium content of about 5.4% of which no more than 0.3% is derived from potassium chloride, contains not over about 0.4% nitrogen and not over about 0.2% phosphorus, which has a specific rotation of about zero, has a pH value of between about 7 and about 8.5 in an aqueous concentration of from about 0.1 to 1.0%, and has a molecular weight of at least about $1 \times 10^6$, to make an acidizing composition of decreased fluid loss, of retarded attack of calcareous rock, and of increased resistance to deterioration by heat; injecting the acidizing composition so made down the wellbore of the well at sufficient pressure to force at least a portion thereof into the formation into contact with the exposed faces of the formation to effectuate a controlled attack by the acid on the calcareous formation.

2. The method according to claim 1 wherein the polysaccharide is Polysaccharide B–1459.

3. The method according to claim 1 wherein the polysaccharide is employed in an amount between about 0.03 and about 1.80% by weight based on the weight of the resulting treating composition so made.

4. The method according to claim 1 wherein the aqueous acidic fluid is a solution of brine and acid.

References Cited by the Examiner

UNITED STATES PATENTS

| | | | |
|---|---|---|---|
| 2,596,137 | 5/1952 | Fast | 252—8.55 |
| 2,689,230 | 9/1954 | Cardwell et al. | 166—42 |
| 2,885,004 | 5/1959 | Perry | 166—42 |
| 3,000,790 | 9/1961 | Jeanes et al. | 195—31 |
| 3,007,879 | 11/1961 | Jordon | 252—8.5 |
| 3,020,207 | 2/1962 | Patton | 195—31 |

OTHER REFERENCES

U.S. Department of Agriculture Publication CA–N–9 "Information of Polysaccharide B 1459," September 1959, S, 584,U5a4.

CHARLES E. O'CONNELL, *Primary Examiner.*